No. 827,588. PATENTED JULY 31, 1906.
A. W. WARNOCK.
MIXING VALVE FOR WATER SUPPLIES.
APPLICATION FILED JULY 22, 1905.

3 SHEETS—SHEET 1.

WITNESSES:
INVENTOR:

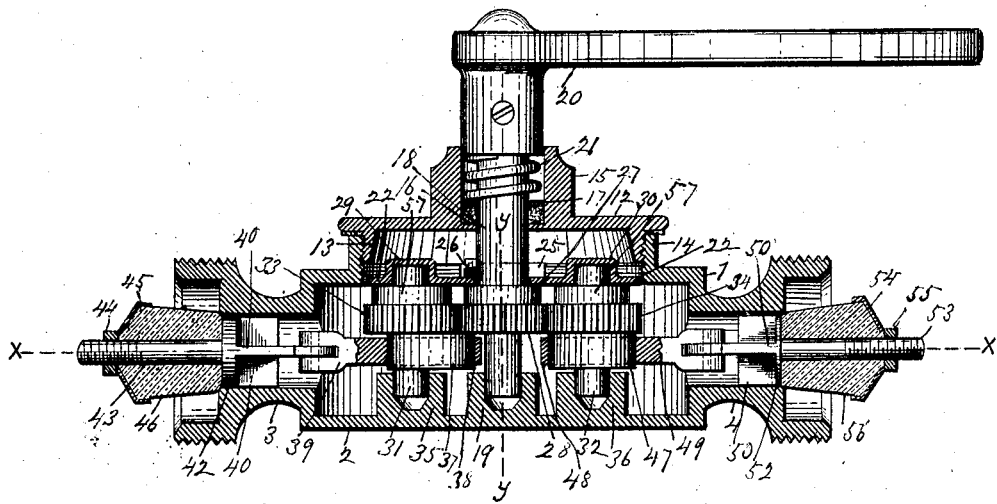

No. 827,588. PATENTED JULY 31, 1906.
A. W. WARNOCK.
MIXING VALVE FOR WATER SUPPLIES.
APPLICATION FILED JULY 22, 1905.

3 SHEETS—SHEET 3.

WITNESSES:
John Buckler,
M. A. Atwood.

INVENTOR:
Amos W. Warnock
By his Atty Henry Williams

UNITED STATES PATENT OFFICE.

AMOS W. WARNOCK, OF BOSTON, MASSACHUSETTS, ASSIGNOR TO DALTON-INGERSOLL MANUFACTURING COMPANY, OF BOSTON, MASSACHUSETTS, A CORPORATION OF MASSACHUSETTS.

MIXING-VALVE FOR WATER-SUPPLIES.

No. 827,588.

Specification of Letters Patent.

Patented July 31, 1906.

Application filed July 22, 1905. Serial No. 270,837.

*To all whom it may concern:*

Be it known that I, AMOS W. WARNOCK, a citizen of the United States, residing at Boston, in the county of Suffolk and State of Massachusetts, have invented certain new and useful Improvements in Mixing-Valves for Water-Supplies, of which the following is a specification.

This invention relates more particularly to mixing-valves connected with the hot and cold water supply pipes of bath-tubs; but it may be employed in any other connection for mixing hot and cold water or different fluids where it can be of service.

A common and well-known contrivance for mixing hot and cold water and conducting it into bath-tubs comprises a plug with hot and cold water ports. This plug is provided with certain ground surfaces and is very apt to bind and stick, inasmuch as the hot and cold water expand and contract it, with the effect that its operation is seriously interfered with.

One of the principal objects of this invention is to provide a mixing-valve in which ground surfaces are practically done away with.

Other objects are to control the two valves (for hot and cold water) from one central stem and to in other respects render the operation of the device more efficient, sure, and permanent.

The invention consists of the novel construction, combination, and arrangement of parts fully described below and illustrated in the accompanying drawings, in which—

Figure 1:
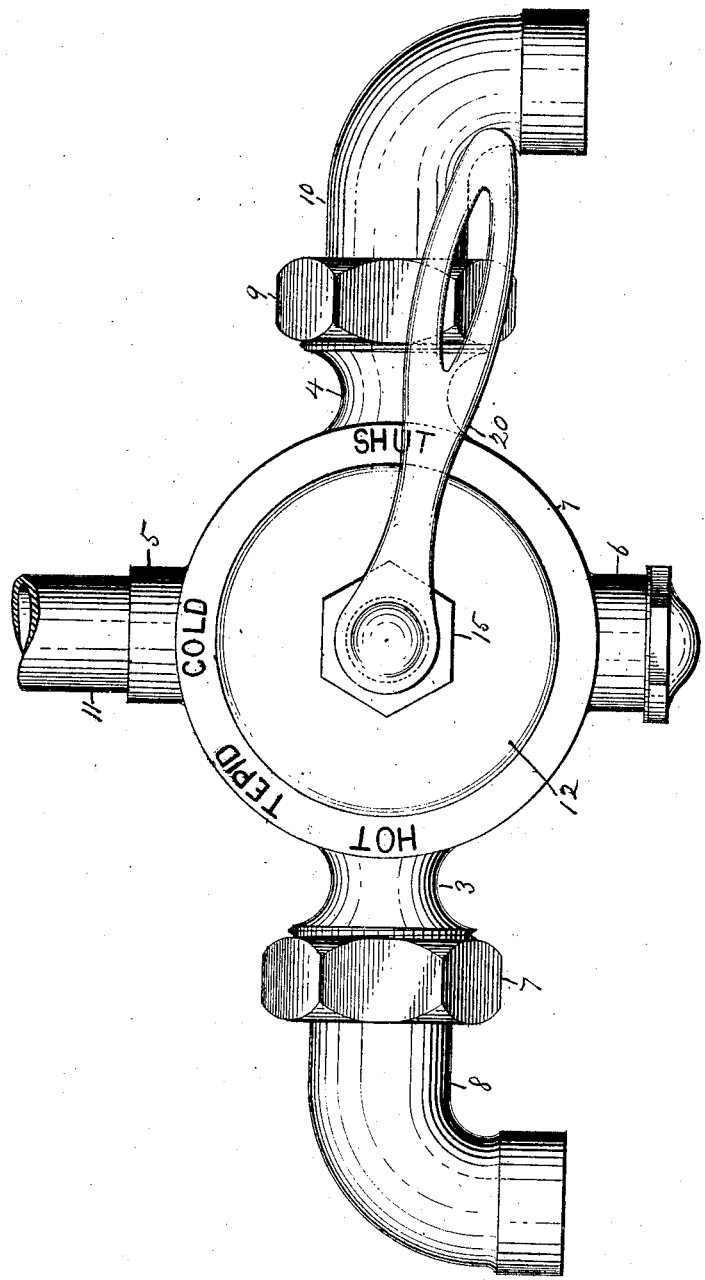
Figure 4:
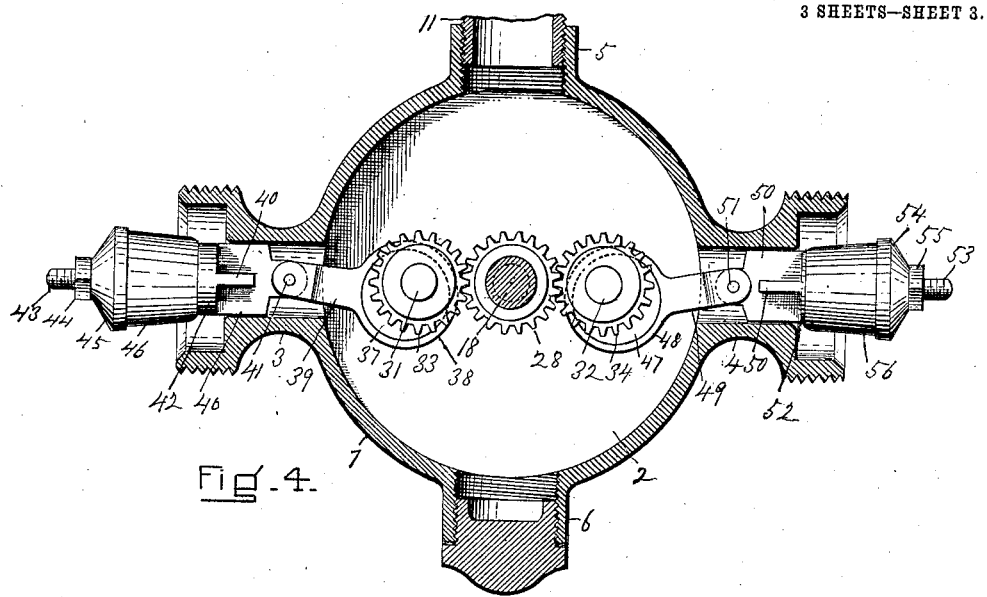
Figure 5:
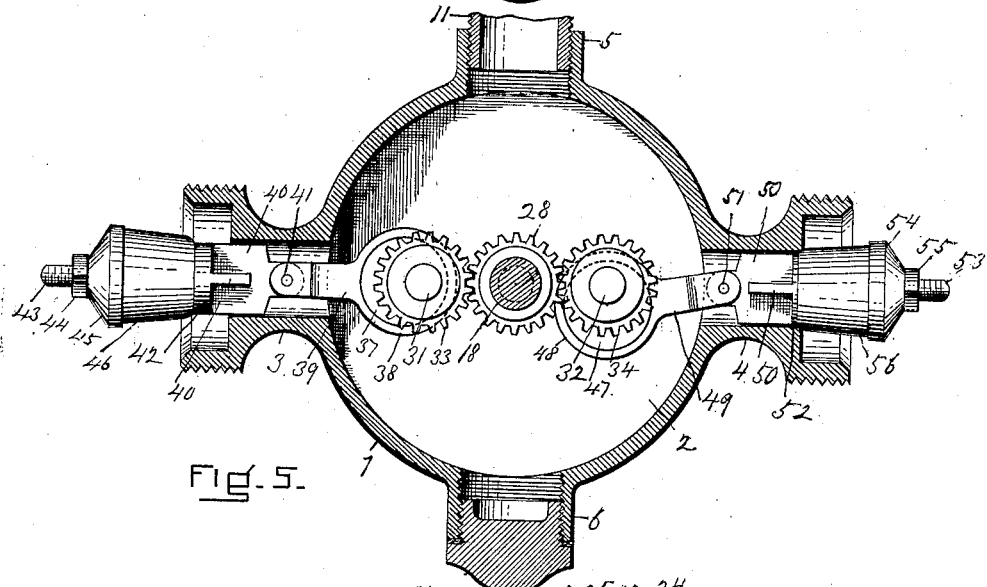
Figure 6:
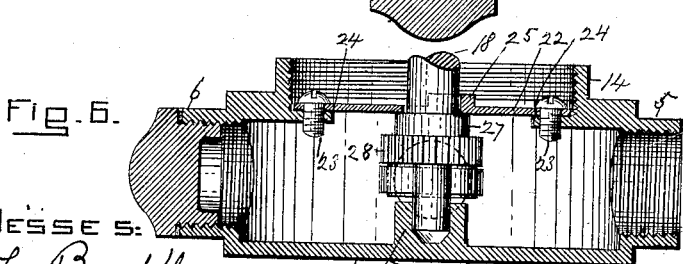

Figure 1 is a view in elevation of my improved mixing-valve, hot and cold water inlet or supply pipes being shown in position and portions of an outlet-pipe leading to the bath-tub and a pipe leading to a shower. In this figure the valve is illustrated in a closed position. Fig. 2 is a central longitudinal vertical section of the same. Figs. 3, 4, and 5 are horizontal sections taken on line $x\ x$, Fig. 2, showing the parts in three positions—viz., letting in cold water only in Fig. 3, letting in a mixture of hot and cold water, producing a flow of tepid water in Fig. 4, and letting in hot water only in Fig. 5. Fig. 6 is a section taken on line $y\ y$, Fig. 2.

Similar characters of reference indicate corresponding parts.

The reference-numeral 1 represents a cylindrical case provided with the rear wall 2, hot-water-inlet port 3, cold-water-inlet port 4, the outlet-port 5, and preferably another outlet-port 6. The inlet-port is externally screw-threaded and connected by a suitable nut 7 with a pipe 8, which leads to the hot-water supply. The port 4 is externally screw-threaded and connected by a suitable nut 9 with the pipe 10, which leads to the cold-water supply. The port 5 is internally screw-threaded to receive the outlet-pipe 11, which leads to the interior of the bath-tub, and the outlet-pipe 6 may connect with a suitable shower apparatus. This case, including the wall 2 and the ports, is made, preferably, integral and of any suitable metal.

The cover or front plate 12 of the case is provided with an annular shoulder 13, whereby it screws into a flange 14, which is integral with the case, and integral with said plate or cover is a tubular nut 15, which operates both as a hand-nut and stuffing-nut, the stuffing being confined between an inwardly-extending flange 16, Fig. 2, integral with the plate 12, and a ring 17. The plate or cover 12 has inscribed on its surface near the hot-water port the word "Hot," between the word "Tepid," near and the outlet-port 5 the word "Cold," and near the outlet-port 5 the word "Cold," and near the hot-water-inlet port 4 the word "Shut."

18 represents a stem or spindle which extends through the tubular nut 15 and the plate 12 into the chamber in the case, its inner end being stepped in a socket 19. A suitable handle 20 is secured to the upper end of this stem, and a spiral spring 21 surrounds the stem between the hub of the handle and the washer 17. A circular disk 22 surrounds the stem or spindle 18 inside and next the lower end of the flange 14, said disk being secured, by means of screws 23, to extensions 24, Fig. 6, integral with the plate 12, said disk being provided on its upper side next the spindle or stem 18 with a curved stop 25, which extends for nearly half the distance around the spindle. This spindle is provided with a pin or screw 26, Fig. 2, which extends radially next the disk 22 between the ends of the curved stop. Next the inner side of the disk 22 the spindle or stem is provided with a collar 27, and beyond the collar it has rigidly secured to it the gear-wheel 28.

The disk 22 is formed up into sockets 29 and 30 to receive the upper ends of the spindles 31 and 32, respectively, said spindles 31 and 32 being provided, respectively, with gear-wheels 33 and 34, engaged by the gear-wheel 28. The inner ends of these spindles 31 and 32 are supported in sockets 35 and 36. Rigid on the spindle 31 is an eccentric disk 37, surrounded by a ring 38, which is integral with the portion 39 of a jointed valve-stem comprising said portion and the winged and guiding portion 40, pivotally connected at 41 with the portion 39. The part 40 of the jointed valve-stem comprises radiating wings, preferably four in number, which operate as guides in the port 3 and are rigid with a head 42, from which a rod 43, Fig. 2, extends outward and is threaded to receive a nut 44, which holds in position a cap 45, between which and the head 42 a conical elastic (preferably rubber) valve 46 is secured. Rigid on the spindle 32 is an eccentric disk 47, surrounded by a ring 48, which is integral with the portion 49 of a jointed valve-stem comprising said portion and the winged and guiding portion 50, pivotally connected at 51 with the portion 49. Rigid with the portion 50 is the head 52, from which a rod 53 extends outward through the cap 54, a nut 55 holding the conical elastic valve 56 between said head and cap. The construction of the two valves and valve-stems is exactly the same with the exception that the head 52 is much thinner than the head 42. Suitable collars or washers 57 are provided between the gear-wheels 33 and 34 and the disk 22.

In Figs. 1 and 2 both the valves are closed, and no water can pass into the mixing-chamber. The pin or screw 26 is against one end of the curved stop 25, so that the handle 20 can only be swung in one direction—that is, toward the left. The gears are so arranged that when the valves are in this closed position the eccentric 37 is projecting for practically its fullest extent toward the stem 18, drawing the conical elastic portion 46 of the valve to its seat by means of the jointed valve-stem 39 40, closing the hot-water port 3. The eccentric 47 has its cam portion turned about a quarter-turn from the stem 18 and sufficiently in that direction to draw, by means of the jointed valve-stem 49 50, the elastic conical portion 56 to its seat, closing the cold-water port 4.

By swinging the handle 20 toward the left until it is opposite the word "Cold" the gear 28 rotates the eccentric 47 toward the cold-water port 4 and moves the head 52 away from the valve-seat, opening said port, as shown in Fig. 3. Thus cold water is allowed to enter through the port 4 and to pass through the chamber and out through the port 5, thus providing cold water only. At the same time the gear 28 rotates the gear 33 and moves the cam 37 about a quarter-turn toward the hot-water port 3, moving the valve 46 from its seat, but not opening the port, as the head 42 is made broad enough to hold the port closed during said movement of the cam 37.

Swinging the handle 20 from the word "Cold" to the word "Tepid" causes the parts to be moved from the position indicated in Fig. 3 to that illustrated in Fig. 4. In the last-named figure the gear 28 has still further rotated the gear 34, rotating the eccentric 47 until its cam portion has drawn the head 52 toward the valve-seat. At the same time the gear 28 has rotated the gear 33 until the eccentric 37 has pushed the head 42 entirely out of contact with the valve-seat. Thus cold water is entering through the port 4 and hot water through the port 3, the water mixing in the chamber and passing out in a tepid condition through the port 5.

Swinging the handle 20 from the word "Tepid" to the word "Hot" causes the parts to be moved from the position indicated in Fig. 4 to that illustrated in Fig. 5, in which the gear 28 has rotated the gear 34 until the cam 47 has drawn the thin head 52 into the port 4, the elastic portion 56 of the valve being thus brought to a closed position. At the same time the gear 28 has rotated the gear 33 until the cam 37 has pushed the comparatively thick head 42 still farther from the port 3, letting in a flow of hot water through said port and furnishing hot water only to the port 5. This movement brings the pin 26 against the opposite end of the curved stop 25.

It will be noticed that by means of the jointed valve-stems and their guiding-wings 40 the valves are brought perpendicularly to their seats, or, in other words, they move on radial lines with relation to the casing and in absolute line with each other. Moreover, each of the hot and cold water valves is controlled positively and directly and in a sense independently by the same actuating central stem or spindle 18. Thus positiveness of movement and operation of both valves is secured, and their movements are kept in lines which are perpendicular to the seats, and by means of the jointed valve-stems there is practically no binding or jamming. The absence of a plug and its ground surfaces prevents any danger of the valve being affected by expansion and contraction. It will be noticed that the part 15 constitutes both a hand-nut and a stuffing-nut. Thus there is a constant tension on the packing or stuffing.

It is understood, of course, that there may be as many ports or outlets for the outflow of hot, cold, or tepid water as may be desired.

Having thus fully described my invention, what I claim, and desire to secure by Letters Patent, is—

1. In a mixing-valve of the character described, a case provided with a mixing-chamber and with hot and cold water inlet ports and an outlet-port; valves in said inlet-ports; an actuating stem or spindle extending into the mixing-chamber; separate eccentric valve-operating mechanisms intermediate of the central stem and the said valves; and mechanisms intermediate of the central stem and the valve-operating mechanisms, whereby each valve is operated and controlled directly by the actuating-stem.

2. In a mixing-valve of the character described, a case provided with a mixing-chamber and with hot and cold water inlet ports and an outlet-port; valves in said inlet-ports; an actuating stem or spindle extending into the mixing-chamber; separate eccentric valve-operating mechanisms intermediate of the central stem and the said valves; valve-stems intermediate of the valve-operating mechanisms and the valves; and mechanisms intermediate of the central stem and the valve-operating mechanisms, whereby each valve is operated and controlled directly by the actuating-stem.

3. In a mixing-valve of the character described, a case provided with a mixing-chamber and with hot and cold water inlet ports and an outlet-port; valves in said inlet-ports; an actuating stem or spindle extending into the mixing-chamber; separate eccentric valve-operating mechanisms intermediate of the central stem and the said valves; jointed valve-stems intermediate of the valve-operating mechanisms and the valves; and mechanisms intermediate of the central stem and the valve-operating mechanisms, whereby each valve is operated and controlled directly by the actuating-stem and moved on lines which are perpendicular to its valve-seat.

4. In a mixing-valve of the character described, a case provided with a mixing-chamber and with hot and cold water inlet ports and an outlet-port; valves in said inlet-ports; an actuating stem or spindle extending into the mixing-chamber; a gear-wheel on said stem; separate spindles each provided with a gear-wheel adapted to be engaged by the gear-wheel on the stem; an eccentric on each of said spindles; and jointed valve-stems provided with suitable guides intermediate of the said eccentrics and the valves, the gear on the actuating-stem engaging directly with both the gear-wheels on the spindles, for the purpose set forth.

5. In a mixing-valve of the character described, a case provided with a mixing-chamber and with hot and cold water inlet ports and an outlet-port; valves in said inlet-ports; an actuating stem or spindle extending into the mixing-chamber; separate valve-operating mechanisms intermediate of the central stem and said valves; and mechanisms intermediate of the central stem and the valve-operating mechanisms and each operated directly by said stem, for the purpose set forth.

6. In a mixing-valve of the character described, a case provided with a mixing-chamber and with two inlet-ports and an outlet-port; valves in said inlet-ports, one of said valves being adapted to extend farther into its port than the other; an actuating stem or spindle; separate valve-operating mechanisms intermediate of the central stem and said valves; and mechanisms intermediate of the central stem and the valve-operating mechanisms, for the purpose set forth.

In testimony whereof I have signed my name to this specification in the presence of two subscribing witnesses.

AMOS W. WARNOCK.

Witnesses:
HENRY W. WILLIAMS,
A. K. HOOD.